(12) United States Patent
Roffman et al.

(10) Patent No.: US 6,582,076 B1
(45) Date of Patent: Jun. 24, 2003

(54) OPHTHALMIC LENSES USEFUL IN CORRECTING ASTIGMATISM AND PRESBYOPIA

(75) Inventors: Jeffrey H. Roffman, Jacksonville, FL (US); Timothy R. Poling, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/650,944

(22) Filed: Aug. 30, 2000

(51) Int. Cl.⁷ ................................ G02C 7/04
(52) U.S. Cl. ...................... 351/161; 351/177
(58) Field of Search ..................... 351/161, 160 R, 351/160 H, 162, 177–178

(56) References Cited

U.S. PATENT DOCUMENTS

| | | | |
|---|---|---|---|
| 5,652,638 A | 7/1997 | Roffman et al. | 351/161 |
| 5,805,260 A | 9/1998 | Roffman et al. | 351/161 |
| 5,847,802 A | 12/1998 | Menezes et al. | 351/161 |
| 6,142,625 A | 11/2000 | Sawano et al. | 351/161 |

FOREIGN PATENT DOCUMENTS

| | | |
|---|---|---|
| EP | 0742461 A | 11/1996 |
| EP | 0745876 A | 12/1996 |

OTHER PUBLICATIONS

Applicant, Johnson & Johnson Vision Care, Inc., International Search Report Appln. No. PCT/US01/26570 dated Jan. 23, 2002.

*Primary Examiner*—Jordan M. Schwartz
(74) *Attorney, Agent, or Firm*—Anne B. Kiernan

(57) ABSTRACT

This invention includes an ophthalmic lens having a convex surface and an opposite concave surface where one of said surfaces contains alternating distance and near power zones where one or more distance zones have cylinder power.

15 Claims, 4 Drawing Sheets

OPHTHALMIC LENSES USEFUL IN CORRECTING ASTIGMATISM AND PRESBYOPIA

FIELD OF THE INVENTION

The invention relates to ophthalmic lenses. In particular, the invention provides lenses that are useful in the correction of presbyopia and astigmatism.

BACKGROUND OF THE INVENTION

As an individual ages, the eye is less able to accommodate, or bend the natural lens, to focus on objects that are relatively near to the observer. This condition affects is medically known as presbyopia. Typically aging patients have varying combinations of presbyopia, astigmatism, myopia, and hypermetropia, and fitting these patients with contact lenses presents a challenge. In particular, correcting the vision of patients with astigmatism and presbyopia is difficult, and over the years a number of methods of dealing with this problem have been suggested.

One known method, is a contact lens that has a series of alternating spherical optical powers corresponding to the spherical distance power prescription, the spherical near power prescription, and a third spherical power which takes the cylindrical power into account, but does not use a cylindrical surface. Another approach to this problem combines a multifocal toric lens that corrects corneal or lenticular astigmatism with a correction for presbyopia. This contact lens has a front surface and an opposite back surface where one of these two surfaces has multifocus annular toric rings with alternating near distance and far distance powers, that corrects astigmatism.

Although these lenses improve the visual acuity of an astigmatic presbyope, they suffer from at least one drawback. Both contact lenses correct for astigmatism in the near vision as well as the far vision. When near power is added it adds more power to the distance power. By adding cylinder power to both distance and near power, the plus value of the near power is partially negated by an extra minus cylinder power. Therefore, a need exists for a contact lens which may be used by astigmatic presbyopes which corrects the astigmatism in their distance vision without unnecessarily correcting the astigmatism in their near vision. It is this need that the lenses of this invention meet.

DETAILED DESCRIPTION OF THE INVENTION

Figure 1:
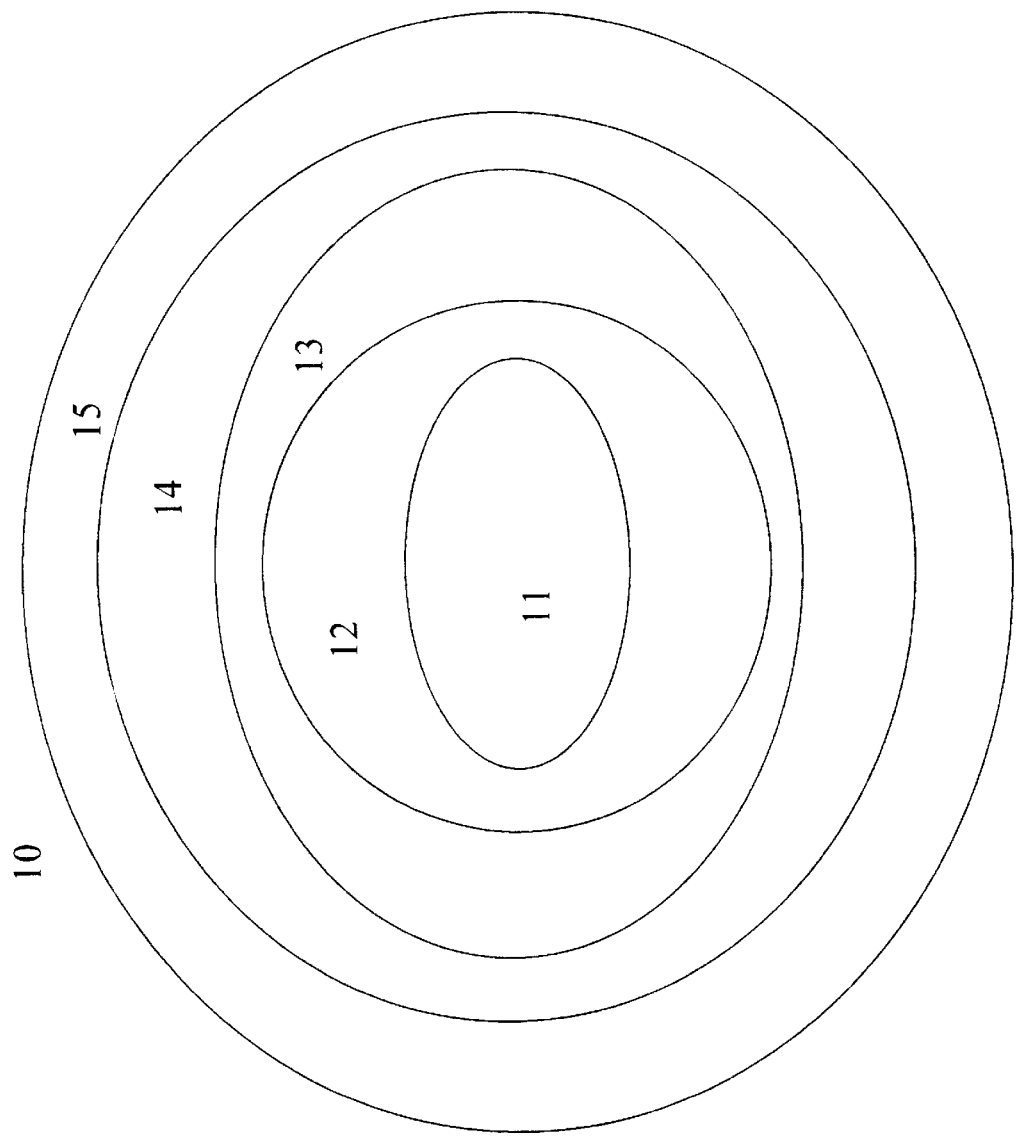
FIG. 1 illustrates a magnified plan view of the back surface of an ophthalmic lens of the invention.

The invention provides an ophthalmic lens suitable for correcting the vision of astigmatic presbyopes. Particularly, the invention comprises, consists essentially of, and consists of an ophthalmic lens comprising a convex surface and a concave surface wherein
one of said surfaces comprises a center zone having distance spherical and cylinder optical power and
at least one concentric annular ring having optical power selected from one member of the group consisting of
(a) a distance spherical and cylinder optical power,
(b) a near optical power, and
(c) a distance spherical optical power.

As used herein, "ophthalmic lens" refers to contact lenses and intraocular lenses, or the like, where the preferred lens is a contact lens, more preferably a soft contact lens made of hydrogel such as etatilcon A. These lenses and material are known in the art. Illustrative examples of these materials may be found in U.S. Pat. Nos. 5,681,114, 5,809,260, 5,898,473, 5,864,379, 5,812,236 which are hereby incorporated by reference with respect to the hydrogel formulations contained therein.

The phrases "concave surface" and "convex surface" refer to the back and front surface, respectively of the lens. Others have referred to the concave surface as the back curve and the convex surface as the front curve and the authors intend that meaning for these terms. One surface of the ophthalmic lenses of this invention contains a central zone and at least one annular ring. It is preferred that the surface having said zone and annular ring is the concave surface. The other surface of the opthalmic lens contains a conventional spherical or aspherical optic zone, surrounded by peripheral annuli to control the fit or a conventional spherical or aspherical optic zone having a certain thickness to control the fit. It is preferred that the other surface is the convex surface having a certain thickness to control the fit.

The phrase "center zone" refers to the portion that is the center of the ophthalmic lens. "Concentric annular ring," refers to a ring that surrounds the center zone. The phrase "distance spherical and cylinder optical power" refer to the amount of refractive power required to correct the wearer's distance visual acuity to the desired degree where said power has a spherical and cylinder components. The term "near optical power" refers to the amount of refractive power required to correct the wearer's near visual acuity to the desired degree but does not include a cylinder component. The terms "distance spherical optical power" refer to the amount of refractive power required to correct the wearer's distance visual acuity to the desired degree where said power has a spherical component, but which does not include a cylinder component. It is preferred that the at least one concentric annular ring have near optical power.

Although it is required that the lenses of the invention have at least one concentric annular ring, the lenses may have about 4 to 20 concentric annual rings. The preferred number of annular rings is about 4 to 7. It is also preferred that the annular rings alternate in their optical power-rings of near optical power are adjacent to rings of distance optical power. For example if a lens of the invention has a center zone and two annular rings, the center zone will have distance spherical and cylinder optical power, the first annular ring, adjacent to and concentric with the center zone, will have near power; and the second annular ring, adjacent to and concentric with the first annular ring will have distance spherical and cylinder optical power. Not all rings of distance optical power rings need have cylinder power, and it is preferred that at least about three (3) of said distance rings have cylinder power.

Contrary to the distance optical power rings, all near optical power rings have spherical power, only. Although astigmatism usually affects the near vision as well as the far vision, tests have shown, that astigmatism need not be corrected in both near and far vision to adequately correct a person's vision. Even without correcting astigmatism in their near vision, patients can often perform their routine tasks, such as reading print that is the size of newspaper print. Additionally, in some patients, the extra cylindrical power in the near zone is deleterious to their vision.

The size of the rings and center zone are related to the pupil size of the patient. This relationship is known in the art and is described in U.S. Pat. No. 5,929,969, which is hereby incorporated by reference herein in its entirety.

In addition, the invention comprises, consists essentially of, and consists of an ophthalmic lens comprising a convex surface and a concave surface wherein
one of said surfaces comprises a center zone having near optical power and
at least one concentric annular ring having a distance spherical and cylinder optical power.

As used herein the phrases "ophthalmic lens," "concave surface," "convex surface," "center zone," "concentric annular ring," "distance spherical and cylinder optical power," "near optical power," and "distance spherical power" all have their aforementioned meanings and preferred ranges.

Still further, the invention comprises, consists essentially of, and consists of an ophthalmic lens comprising a convex surface and a concave surface wherein
one of said surfaces comprises a center zone having distance spherical optical power and
at least one concentric annular ring having distance spherical and cylinder optical power.

As used herein the phrases "ophthalmic lens," "concave surface," "convex surface," "center zone," "concentric annular ring," "distance spherical and cylinder optical power," "near optical power," and "distance spherical power" all have their aforementioned meanings and preferred ranges.

Figure 2:
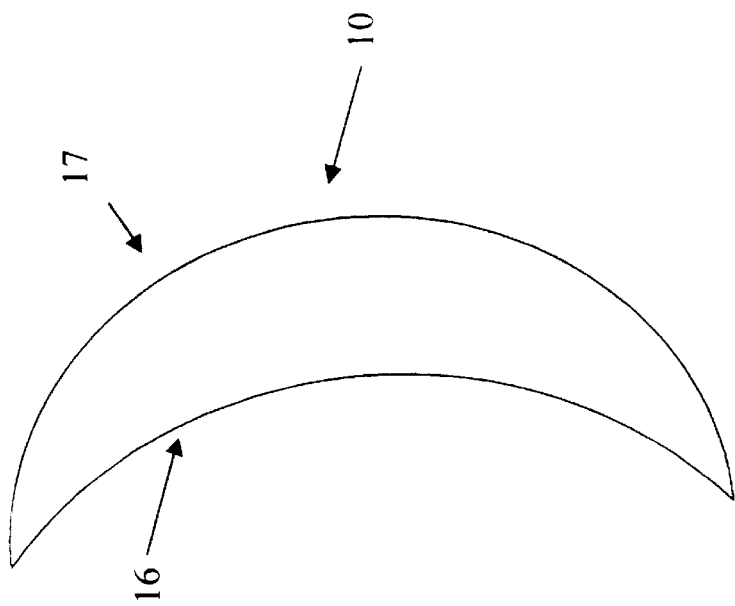
FIG. 2 illustrates a magnified cross-sectional view of an ophthalmic lens of the invention.

FIGS. 1 and 2 illustrate an embodiment of the invention where three of the distance annular rings have spherical power and cylinder power. FIGS. 1 and 2 are respectively back plan and side views of lens 10 of the invention. The concave surface, 16 is on the opposite side of the convex surface 17. Surface 16 has a central zone, 11, that has distance spherical and cylinder optical power. The first concentric annular ring, 12, has near optical power. The third and fifth concentric annular rings, 13 and 15, respectively have distance spherical and cylinder optical power. The fourth concentric annular ring, 14, has near optical power. Surface 17 is a conventional spherical or aspherical optic zone, having a thickness sufficient to control the fit of the lens to the eye.

Figure 3:
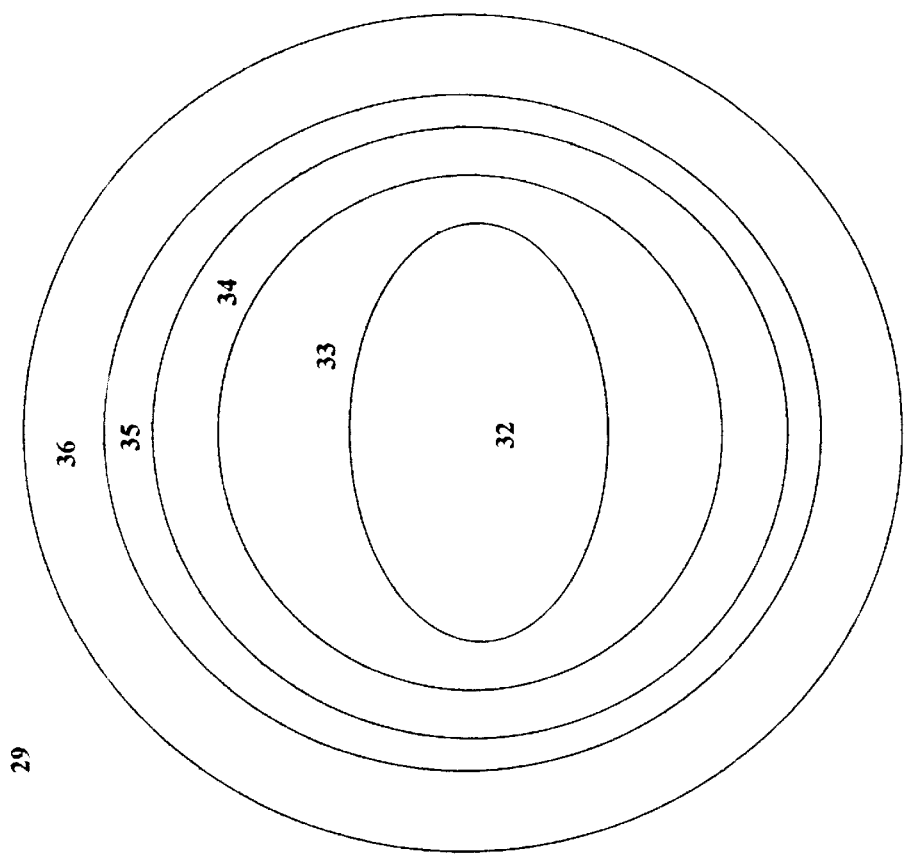
FIG. 3 illustrates a magnified plan view of an ophthalmic lens of the invention.
Figure 4:
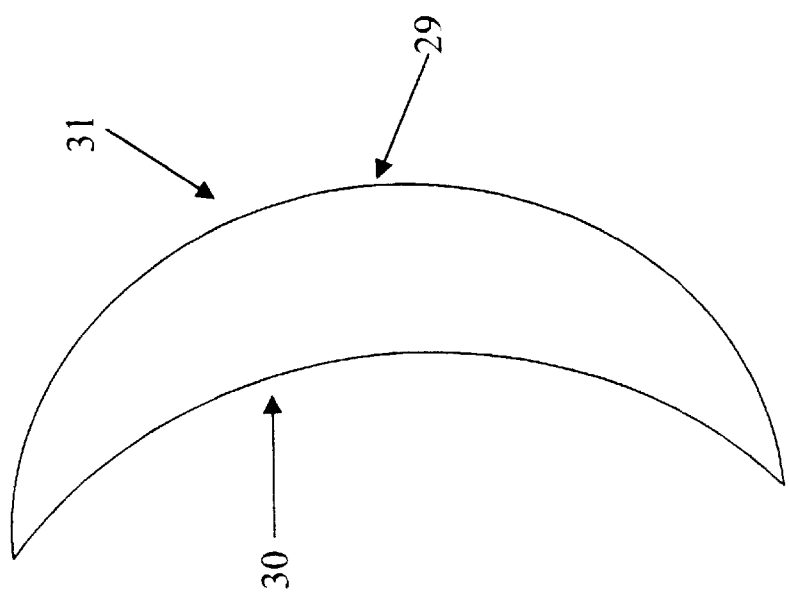
FIG. 4 illustrates a magnified cross-sectional view of an ophthalmic lens of the invention.

Another embodiment of the invention is contains distance spherical and cylinder power in the center zone alone, and is illustrated by FIGS. 3 and 4. Those figures illustrate the back plan and side view of lens 29. The concave surface, 30 is on the opposite side of the convex surface 31. Surface 30 has a center zone, 32, having distance spherical and cylinder optical power. The first concentric annular ring, 33, has near optical power. The second and the fourth concentric annular rings, 34 and 36 respectively, have distance spherical optical power. The fourth concentric annular ring, 35, has near optical power. Surface 31 is a conventional spherical or aspherical optic zone, having a thickness sufficient to control the fit.

The lenses of the invention may be formed by any conventional method, for example as disclosed in U.S. Pat. No. 5,861,114, which is hereby incorporated by reference in its entirety. For example, the annular zones of the lenses of the invention, may be produced by diamond-turning using alternating radii. The zones may be diamond-turned into the molds that are used to form the lens of the invention.

Subsequently, a suitable liquid resin is placed between the molds followed by compression and curing of the resin to form the lenses of the invention. Alternatively, the zones may be diamond-turned from lens buttons.

The invention further includes a method for correcting the vision of an astigmatic presbyope comprising the step of providing a pair of ophthalmic lenses where each ophthalmic lens comprises a convex surface and a concave surface wherein
one of said surfaces comprises a center zone having distance spherical and cylinder optical power and at least one concentric annular ring having optical power selected from one member of the group consisting of
(a) a distance spherical and cylinder optical power,
(b) a near optical power, and
(c) a distance spherical optical power.

Still further, the invention includes a method of designing a lens for the correction of astigmatic presbyopes comprising designing an ophthalmic lens comprising a convex surface and a concave surface wherein
one of said surfaces comprises a center zone having distance spherical and cylinder optical power and at least one concentric annular ring having optical power selected from one member of the group consisting of
(a) a distance spherical and cylinder optical power,
(b) a near optical power, and
(c) a distance spherical optical power.

The invention further includes a method for correcting the vision of an astigmatic presbyope comprising the step of providing a pair of ophthalmic lenses where each ophthalmic lens comprises a convex surface and a concave surface wherein
one of said surfaces comprises a center zone having near optical power and at least one concentric annular ring having a distance spherical and cylinder optical power.

Still further, the invention includes a method of designing a lens for the correction of astigmatic presbyopes comprising designing an ophthalmic lens comprising a convex surface and a concave surface wherein
one of said surfaces comprises a center zone having near optical power and at least one concentric annular ring having a distance spherical and cylinder optical power.

The invention further includes a method for correcting the vision of an astigmatic presbyope comprising the step of providing a pair of ophthalmic lenses where each ophthalmic lens comprises a convex surface and a concave surface wherein
one of said surfaces comprises a center zone having distance spherical optical power and at least one concentric annular ring having distance spherical and cylinder optical power Still further, the invention includes a method of designing a lens for the correction of astigmatic presbyopes comprising designing an ophthalmic lens comprising a convex surface and a concave surface wherein
one of said surfaces comprises a center zone having distance spherical optical power and at least one concentric annular ring having distance spherical and cylinder optical power The embodiments and examples herein do not limit the invention. They are meant only to suggest a method of practicing the invention. Aside from these embodiments and examples, there are other possible embodiments of the invention which will occur to those skilled in the art of ophthalmic lenses for astigmatic presbyopes . Those embodiments are deemed to be within the scope of this invention.

EXAMPLES

Example 1

The vision of a person who has a prescription of −3.00, −2.00×90/+1.50 can be corrected with an etafilcon A contact lens having a central zone and four annular rings. The central zone has a power of −3.00 −2.00×90 diopters the first annular near zone has a power of −1.50 diopters sph, the second annual distance zone has a power of −3.00 diopters sph, the third annular near zone has a power −1.50 diopters sph and the fourth annular distance zone has a power −3.00 diopters sph.

Example 2

The vision of a person who has a prescription of −3.00 −2.00×90/+1.50 can be corrected with an etafilcon A contact lens having a central zone and four annular rings. The central zone has a power of −3.00 −2.00×90 diopters, the first annular near zone has a power of −1.50 diopters sph, the second annual distance zone has a power of −3.00 −2.00×90 diopters sph, the third annular near zone has a power −1.50 diopters sph and the fourth annular distance zone has a power −3.00 −2.00×90 diopters sph.

What is claimed is:

1. An ophthalmic lens comprising a convex surface and a concave surface wherein one of said surfaces comprises a center zone having distance spherical and cylinder optical power, and said surface further comprises one concentric annular ring having non-cylinder near spherical optical power.

2. The ophthalmic lens of claim 1 wherein the concave surfaces comprises said center zone having distance spherical and cylinder optical power and said one concentric annular ring having non-cylinder near spherical optical power.

3. The lens of claim 2 further comprising at least one additional concentric annular ring having optical power selected from one member of the group consisting of (a) a distance spherical and cylinder optical power, (b) a near spherical optical power, and (c) a distance spherical optical power.

4. The ophthalmic lens of claim 3 wherein said at least one additional concentric annular ring comprises four annular rings, one of said four annular rings has distance spherical and cylinder optical power, one of said four annular rings has distance spherical power, and two of said four annular rings have near spherical optical power.

5. The ophthalmic lens of claim 3 wherein said at least one additional concentric annular ring comprises four annular rings, two of said four annular rings have distance spherical optical power, and two of said four annular rings have near spherical optical power.

6. The ophthalmic lens of claim 3 wherein said at least one additional concentric annular ring comprises three annular rings, two of said three annular rings have distance spherical and cylinder optical power and one of said three annular rings has near spherical optical power.

7. The ophthalmic lens of claim 3 wherein said at least one additional concentric annular ring comprises three annular rings, one of said three annular rings has distance spherical and cylinder optical power, one of said three annular rings has distance spherical power, and one of said three annular rings has near spherical optical power.

8. The ophthalmic lens of claim 3 wherein said at least one additional concentric annular ring comprises three annular rings, two of said three annular rings have distance spherical optical power, and one of said three annular rings have near spherical optical power.

9. The ophthalmic lens of claim 1 wherein the ophthalmic lens is a contact lens.

10. The ophthalmic lens of claim 3 wherein said at least one additional concentric annular ring comprises four annular rings, two of said four annular rings have distance spherical and cylinder optical power and two of said four annular rings have near spherical optical power.

11. The lens of claim 2 further comprising at least one additional concentric annular ring having optical power selected from one member of the group consisting of (a) a near spherical optical power, and (b) a distance spherical optical power.

12. A method for correcting the vision of an astigmatic presbyope comprising the step of providing a pair of ophthalmic lenses where each ophthalmic lens comprises a convex surface and a concave surface wherein one of said surfaces comprises a center zone having distance spherical and cylinder optical power said surface further comprises one concentric annular ring having non-cylinder near spherical optical power.

13. The method of claim 12 wherein one of said surfaces further comprises at least one additional concentric annular ring having optical power selected from one member of the group consisting of (a) a distance spherical and cylinder optical power, (b) a near spherical optical power, and (c) a distance spherical optical power.

14. A method of designing a lens for the correction of astigmatic presbyopes comprising designing an ophthalmic lens comprising a convex surface and a concave surface wherein one of said surfaces comprises a center zone having distance spherical and cylinder optical power said surface further comprises one concentric annular ring having non-cylinder near spherical optical power.

15. The method of claim 14 wherein one of said surfaces further comprises at least one additional concentric annular ring having optical power selected from one member of the group consisting of (a) a distance spherical and cylinder optical power, (b) a near spherical optical power, and (c) a distance spherical optical power.

* * * * *